United States Patent [19]

Peterson

[11] Patent Number: 5,050,896
[45] Date of Patent: Sep. 24, 1991

[54] COLLET STOP APPARATUS

[75] Inventor: Donald M. Peterson, Renton, Wash.

[73] Assignees: James A. Haggerty, Oregon City; Thomas E. Hawkes, Canby, both of Oreg.

[21] Appl. No.: 580,201

[22] Filed: Sep. 10, 1990

Related U.S. Application Data

[63] Continuation-in-part of Ser. No. 255,860, Oct. 11, 1988, Pat. No. 4,955,622, which is a continuation-in-part of Ser. No. 180,183, Apr. 11, 1988, abandoned.

[51] Int. Cl.⁵ .................. B23B 31/20; B23B 13/12
[52] U.S. Cl. .................. 279/1 S; 279/2 R; 279/46 R
[58] Field of Search .................. 279/1 S, 1 ME, 2 R, 279/41 R, 46 R

[56] References Cited

U.S. PATENT DOCUMENTS

| | | | |
|---|---|---|---|
| 1,014,051 | 1/1912 | Long | 82/34 C X |
| 1,582,445 | 4/1926 | Border | 279/1 ME |
| 1,645,948 | 10/1927 | Galloway et al. | 279/83 |
| 2,398,278 | 4/1946 | Bailey | 82/34 C X |
| 2,423,551 | 7/1947 | Caffin | 82/34 C X |
| 2,717,128 | 9/1955 | Heizer | 242/42 |
| 2,914,330 | 11/1959 | Wheeler | 279/2 R |
| 2,922,656 | 1/1960 | Belloli | 279/1 S |
| 2,965,381 | 12/1960 | Meyer | 279/46 R |
| 3,115,798 | 12/1963 | Donaway | 82/34 C X |
| 3,188,101 | 6/1965 | Westberg | 279/2 R |
| 3,311,383 | 3/1967 | Cox | 279/2 R |
| 3,360,276 | 12/1967 | Peffer | 279/2 R |
| 3,385,607 | 5/1968 | Hughes | 279/1 S |
| 3,615,101 | 10/1971 | Oliver | 279/1 S |
| 3,876,214 | 4/1975 | Blanchard | 279/1 S |
| 4,702,484 | 10/1987 | Sandwick | 279/1 S |

FOREIGN PATENT DOCUMENTS

| | | | |
|---|---|---|---|
| 180042 | 3/1954 | Austria | 83/875 |
| 2123406 | 4/1972 | Fed. Rep. of Germany . | |
| 1202735 | 1/1986 | U.S.S.R. . | |
| 1206016 | 1/1986 | U.S.S.R. . | |

Primary Examiner—Steven C. Bishop
Attorney, Agent, or Firm—Klarquist, Sparkman, Campbell, Leigh & Whinston

[57] ABSTRACT

The apparatus includes a body (222) that fits within the bore of a collet (228). An expandable sleeve (223) slides over the body (222). The body (222) includes a flange (240) on one end. A nut (224) is threaded over the other end of the body, with the sleeve (223) disposed between the flange (240) and the nut (224). As the nut is threaded toward the flange (240), the sleeve (223) is wedged between the flange (240) and nut (224), and forced to expand against the collet (228), thereby to fix the position of the stop apparatus body (222) relative to the collet (228). A rod (226) is slidable within the stop apparatus body (222) and may be locked in position relative to the body (222) for providing a stop face (235) for limiting penetration of a work piece (241) that is held by the collet (228).

12 Claims, 2 Drawing Sheets

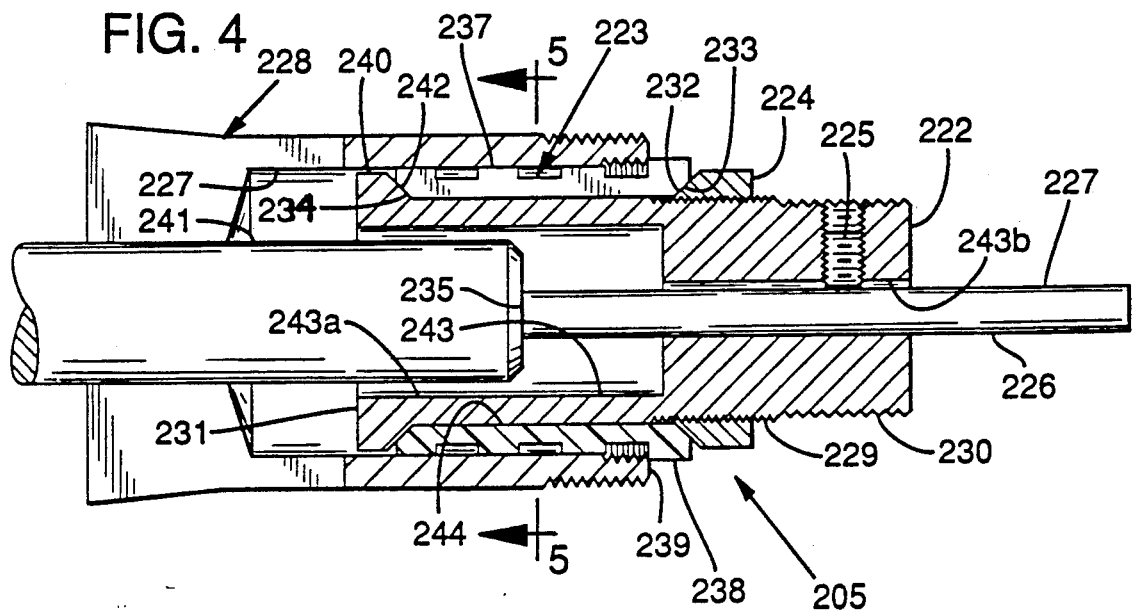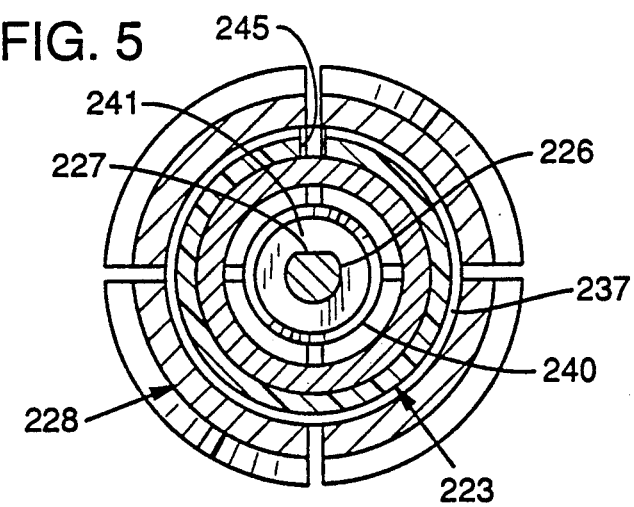

COLLET STOP APPARATUS

CROSS-REFERENCE TO RELATED APPLICATIONS

This application is a continuation-in-part of application No. 07/255,860, filed Oct. 11, 1988, now U.S. Pat. No. 4,955,622 which was a continuation-in-part of application No. 07/180,183, filed Apr. 11, 1988, now abandoned. Applications Nos. 07/180,183 and 07/255,860 are hereby incorporated by reference.

TECHNICAL FIELD

This invention is in the field of machine tools and, specifically, the field of auxiliary apparatuses used on machine tools, such as lathes and drill presses. More specifically, the invention is in the field of auxiliary apparatuses known in the art as collets and, more specifically, the field of stop apparatuses used with collets to control the depth of insertion of workpieces into the collets.

BACKGROUND INFORMATION

Prior art stop apparatuses for use with collets and spindles are shown in U.S. Pat. Nos. 1,014,051; 2,398,278; 2,423,551; 2,922,656; 3,115,798; 3,188,101; 3,311,383; 3,360,276; 3,385,607; 3,615,101; 3,876,214; and 4,702,484.

A prior art stop for collets, manufactured by the Hardinge Company, and which is in wide use, is shown in FIG. 1 of the attached drawings.

Some prior stop apparatuses are configured to fit into collets or spindles that have specific configurations and dimensions. Other devices, such as shown in U.S. Pat. Nos. 2,398,278 and 3,615,101, fit within the bore of a lathe spindle or collet and are expandable against the spindle or collet to hold the stop in position. Requiring each stop apparatus to be adaptable to a particular size and configuration of collet (or spindle) presents an economic burden in that a wide variety of stop apparatuses would be needed by a machinist to fit each collet of a range of collet sizes. For example, with the Hardinge device, the part termed the stop holder is dimensioned to fit a specific size of collet.

The collet stop shown in U.S. Pat. No. 3,615,101 is retained in place within the collet by a member that is expanded by tightening a nut having a conical face against a conically shaped end of the expandable member. The collet stop is difficult to use because the nut for expanding the expandable member is located inside the collet and thus is difficult to reach.

SUMMARY OF THE INVENTION

This invention is directed to a collet stop apparatus that lacks the complexity of prior devices and that is adjustable to fit a range of sizes of collets, thus reducing the number of collet stops needed for a machinist to match a full range of collet sizes. The present apparatus is quickly and easily installed and adjusted.

The collet stop apparatus of the present invention particularly comprises a generally cylindrical body that has a central bore and a flanged end. The end opposing the flanged end is threaded. A resilient, generally tubular sleeve substantially surrounds the body between the flanged and threaded ends of the body. A nut is sized to be threaded to the threaded portion of the body. Both the nut and the flanged end of the body have inclined surface portions that are arranged for urging the sleeve away from the body as the nut is threaded in the direction toward the flanged end of the body. As the sleeve is forced away from the body, the outer surface of the sleeve bears against the interior wall of the collet into which the stop apparatus is inserted.

The stop apparatus includes a grip formed on one end of the body for the purpose of permitting the body to be held against rotation as the nut is threaded toward the flanged end of the body. The grip is sized to fit through the interior diameter of the nut, so that the nut and sleeve can be slid off one end of the stop body.

The stop apparatus also includes a rod that may be secured to the body for the purpose of limiting the depth of penetration of a workpiece into the collet. The rod is locked into place by a mechanism that permits removal of the nut and sleeve from the body while the rod position remains fixed relative to the body.

As another aspect of this invention, the sleeve includes a ribbed exterior surface for providing firm contact against the interior wall of the collet, notwithstanding unevenness or irregularities in the collet interior wall surface.

BRIEF DESCRIPTION OF THE DRAWINGS

FIG. 4 is a cross sectional view of a collet having another embodiment of a stop apparatus mounted thereto.

FIG. 5 is a cross sectional view taken along line 5—5 of FIG. 4.

DETAILED DESCRIPTION OF THE PREFERRED EMBODIMENTS

Figure 1:
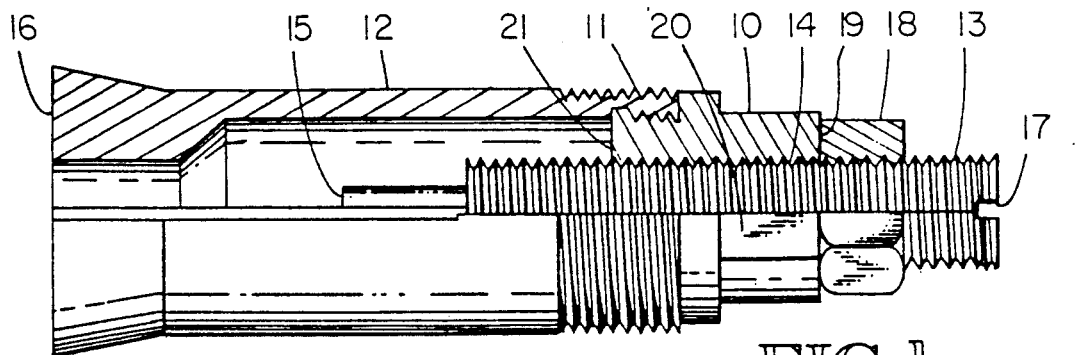
FIG. 1 is a partial sectional view of a collet having a prior art stop apparatus mounted thereto.

FIG. 1 depicts a collet 12 having a prior art stop apparatus mounted or installed within it. The prior apparatus comprises a body 10 that is threaded at 11 into collet 12, the threads being provided in commercially available collets for the specific purpose of the installation of a stop apparatus. Stop rod 13 is threaded into threaded hole 14 in the body. End 15 of the rod 13 is the stop face and its distance from end 16 of the collet is adjusted by turning rod 13 using screwdriver slot 17. The adjustment is locked by turning lock nut 18 against end 19 of the body while keeping the rod from turning. Flat(s) 20 on the body are used to control the turning of the body and/or the collet. The stop rod adjustment procedure requires a wrench and a screwdriver, the wrench to operate the lock nut 18 and the screwdriver to move the rod 13. Maximum extension of the rod toward end 16 may be facilitated by putting the lock nut 18 adjacent to end 21 of the body although this complicates the adjustment procedure.

Figure 2:
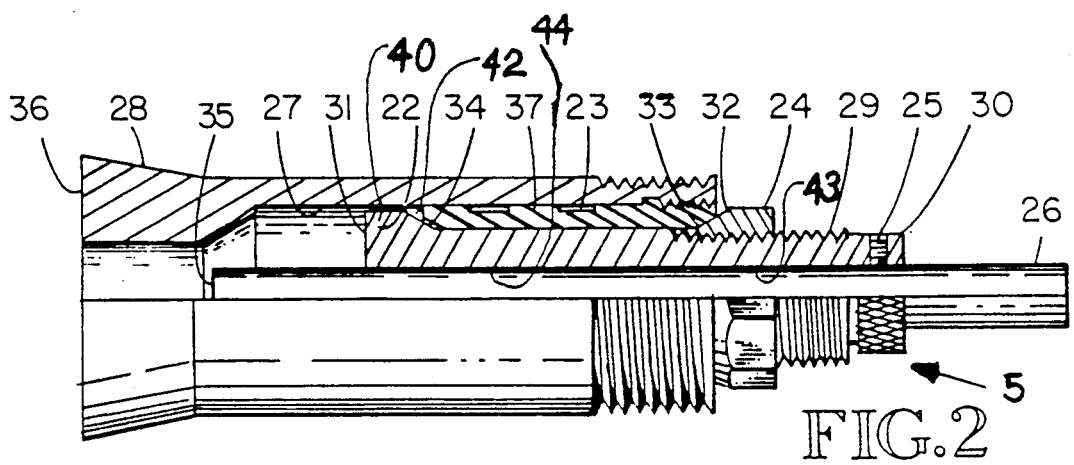
FIG. 2 is a partial sectional view of a collet that includes a stop apparatus of the present invention mounted thereto.

FIG. 2 depicts a collet 28 with a stop apparatus 5 of the present invention installed therein. The apparatus 5 comprises a body 22, sleeve 23, nut 24, set screw 25, and stop rod 26. The body 22 is generally cylindrical and has a smooth-walled bore 43 extending therethrough. The outer surface of the body 22 includes a flange 40 at one end. Flange 40 includes an inclined or conical-shaped surface 42.

The end of the body 22 opposite the flange 40 includes a knurled grip 30. Near the grip 30, the exterior surface of the body includes a threaded portion 29. The outside diameter of the grip 30 is less than the root diameter of the threads on the threaded portion 29 of the body 22. Consequently, the nut 24 fits over the grip 30 and threads onto the threaded portion 29 of the body 22.

The nut 24 includes flats, as a conventional hex nut. The nut 24 also includes an inclined or conical surface 32. The nut 24 is threaded onto the body 22 so that the conical surface 32 faces the conical surface 42 of the flange 40.

The sleeve 23 fits over the body 22. In this regard, the sleeve 23 is a generally tubular member having an internal bore 44. The diameter of the bore 44 is slightly larger than the outside diameter of the body 22 (i.e., the portion of the body away from the flange 40). The sleeve 23 is held between the flange 40 and the nut 24.

The sleeve 23 includes a longitudinal slot (not shown) that extends from one end to the other. The slot permits radial expansion of the sleeve, as described more fully below. Preferably, the sleeve 23 is made of a material such as that manufactured under the trademark DELRIN by E. I. duPont de Nemours & Co.

The ends of the sleeve bore 44 are chamfered to define surfaces 33, 34 at angles that complement those of the conical surfaces 32, 42 of the flange 40 and nut 24.

The outer surface of the body 22 includes radially protruding, spaced apart ribs 37. The individual ribs 37 may be formed to extend around the circumference of the tubular sleeve 23 (FIG. 2) or to extend longitudinally from one end of the sleeve to the other. The ribs 37 permit the sleeve to be held securely to the collet 28, despite unevenness in the surface of the collet bore 27.

The stop apparatus 5, with sleeve 23 attached, is inserted into the bore 27 of the collet 28. The nut 24 is rotated on the threaded portion 29 as the grip 30 is held to prevent rotation of the body 22. As the nut 24 is rotated to move closer to the flanged end of the body, the chamfered surfaces 33, 34 of the sleeve bear upon the conical surface 42 of the flange 40 and conical surface 32 of the nut 24. Consequently, the flexible sleeve 23 is forced away from the body 22 by the wedging or camming action of the conical surfaces 32, 42, as the nut 24 is moved closer to the flange 40. The expansion of the sleeve diameter causes the ribbed exterior surface of the sleeve to bear against the wall of the collet bore 27, thereby fixing the position of the body 22 relative to the collet 28.

The stop rod 26 slides within the bore 43 of the body 22 and includes a flat end 35 for limiting the penetration of a workpiece into the collet 28. The rod position, hence the position of the rod end 35, is fixed relative to the body by a lock mechanism that comprises a set screw 25 that is threaded through one end of the body 22. Once the position of the rod end 35 is established, the set screw 25 is threaded through the grip 30 at one end of the body to bear against the rod 26. Preferably, the set screw length is such that the end of the set screw 25 that is away from the rod 26 does not protrude from the outer surface of the body 22. Consequently, the nut 24 may be removed from the body 22 (for example, for the purpose of cleaning or changing the sleeve 23) without the need to change the rod position relative to the body of the stop apparatus 5.

The use of the set screw 25 permits adjustment of the distance of the end 35 of the rod 26 relative to the body 22 (hence, relative to a collet 28) with a screwdriver or allen wrench. The smooth exterior surface of the rod may be formed with graduations to assist in adjustment of the location of the end 35.

Figure 3:
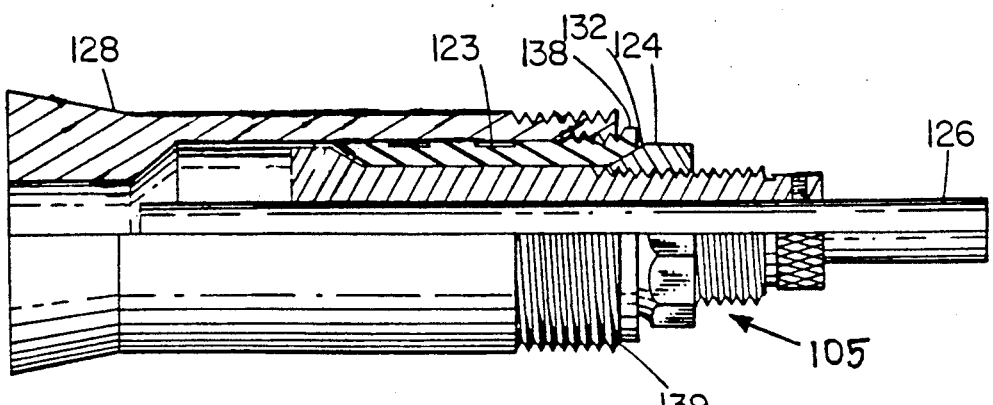
FIG. 3 is a partial sectional view of a collet that includes an alternative embodiment of a stop apparatus mounted thereto.

FIG. 3 is a partial sectional view of a collet 128 with an alternative embodiment of a stop apparatus 105 mounted thereto. In this embodiment, sleeve 123 includes a radially protruding flange 138 on the end of the sleeve 123 nearest the adjustment nut 124. The flange 138 abuts the end 139 of the collet 128 and limits the depth of insertion of the collet stop apparatus 105 into the collet 128, thereby ensuring that the nut 124 remains accessible for installation and removal of the stop apparatus 105.

FIGS. 4 and 5 depict another alternative embodiment of a stop apparatus 205 formed in accordance with the present invention. The stop apparatus 205 is mounted to a conventional collet 228 that is configured for holding a work piece, such as shown at 241 in FIGS. 4 and 5.

The stop apparatus 205 includes a substantially cylindrical rigid body 222, having a flange 240 formed on one end, and a knurled grip 230 formed on the opposing end. The body 222 also includes a bore 243, having a large diameter portion 243a near the flanged end of the body 222, and a contiguous small diameter portion 243b near the grip end of the body. The diameter of the large diameter portion 243a of the bore 243 is greater than the diameter of the small diameter portion 243b. The large diameter portion 243a permits a correspondingly large diameter work piece 241 to be inserted into the stop apparatus body 222 beyond the outer face 231 of the body.

The diameter of the small diameter portion 243b of the bore 243 corresponds to the diameter of the stop rod 226 that slides therein. The stop rod 226 is passed through the bore portion 243b until the position of the stop face 235 of the rod 226 is located to hold the workpiece 241 in a precise position relative to the collet 228 whenever the end of the work piece 241 abuts the rod stop face 235.

With the stop rod 226 properly positioned, a set screw 225 is threaded through the knurled grip 230 to bear upon the rod 226, thereby locking the rod in place. The length of the set screw 225 is such that the end of the set screw that is away from the rod 226 does not protrude beyond the outer surface of the body 222. The set screw 225, therefore, does not interfere with removal or replacement of the sleeve 223 described below.

Preferably, a flat 227 is provided on the rod 226 so that the set screw 225 may bear evenly against the rod. Moreover, the flat 227 provides a recess from the wall of the bore portion 243b so that any upwardly protruding burrs that may form on the rod 226 as set screw 225 is forced against the rod will not interfere with the sliding movement of the rod 226 when the rod is thereafter repositioned relative to the body 222.

As is described with respect to the embodiment of FIG. 3, the stop apparatus 205 also includes a flexible, expandable sleeve 223, which slides over the knurled grip 230 on one end of the body 222 and abuts the flange 240 on the other end of the body. This sleeve 223 is held in position by a nut that is threaded on to an externally threaded portion 229 of the body, just inside the knurled grip 230.

The sleeve 223 includes a longitudinal slot 245 (FIG. 5), extending from one end of the sleeve to the other. The exterior surface of the surface 223 also includes radially protruding ribs 237 for engaging the bore 227 of the collet 228. The sleeve 223 also includes a radially-protruding flange 238 on the end of the sleeve nearest the adjustment nut 224. The flange 238 protrudes radially outwardly for a distance greater than the diameter of the internal bore 227 of the collet 228. Consequently, the flange 238 abuts the end 239 of the collet 228, thereby preventing the nut 224 from being threaded into the bore 227 of the collet 228.

The ends of the sleeve bore 244 are chamfered to define surfaces 233, 234 at angles that complement the angles of conical surface 242 on the flange, and the conical surface 232 on one side of the nut 224. As the nut 224 is rotated over threaded portion 229 toward the flange 240 of the body, the chamfered surfaces 233, 234 of the sleeve, bear upon the conical surface 242 of the flange 240 and conical surface 232 of the nut 224. Consequently, the flexible sleeve 223 is forced away from the body 222 by the wedging action of the conical surfaces 232, 242 as the nut 224 is moved closer to the flange 240. The ribs 237 of the exterior surface of the sleeve 223 are forced by the wedging action against the collet bore 227 to fix the position of the body 222 relative to the collet 228.

The stop apparatus 205 is constructed so that the sleeve 223 may be replaced or cleaned without the need for altering the position of the stop rod 226 relative to the body 222. In this regard, the diameter of the grip portion 230 of the body is less than the root diameter of the threaded portion 229 of the body. Consequently, the nut 224 may be threaded off portion 229 and slid over the grip 230. The sleeve 232 may then be slid from the grip end, cleaned or replaced with a larger or smaller size sleeve, and slid back over the body, followed by the nut 224. The rod 226 remains locked in position because the set screw 225 (recessed as it is within the body 222) need not be moved as the sleeve 223 is removed and replaced.

While preferred embodiments of the invention are described herein, other embodiments and variations of those disclosed are considered to be within the scope of the invention as described in the attached claims.

I claim:

1. A stop apparatus, comprising:
    a body having a central bore and a flanged first end and a second end, the body including an externally threaded portion near the second end;
    an expandable tubular sleeve member substantially surrounding the body between the first and second ends of the body;
    a nut sized to be threaded to the externally threaded portion of the body, the nut and flanged first end of the body each having inclined surface portions arranged for urging the sleeve away from the body as the nut is threaded in a direction toward the first end of the body; and
    a grip attached to the second end of the body and sized to pass through the nut as the nut is removed from the body.

2. The apparatus of claim 1, further comprising:
    a rod that is positionable within the bore of the body; and
    lock means attached to the grip for fixing the position of the rod relative to the body and for allowing the nut to be removed from the body while the rod position remains fixed relative to the body.

3. The apparatus of claim 2 wherein the lock means includes a set screw threaded through the grip to bear upon the rod.

4. The apparatus of claim 1 wherein the grip is an integral part of the body.

5. The apparatus of claim 1 wherein the grip comprises a knurled external surface portion of the body, the threaded portion of the body being between the flanged end and the grip.

6. The apparatus of claim 5 wherein the knurled external surface portion and the externally threaded portion of the body are substantially circular in cross section, the diameter of the knurled external surface portion of the body being less than the diameter of the externally threaded portion of the body.

7. The apparatus of claim 1 wherein the sleeve includes a ribbed exterior surface.

8. The apparatus of claim 7 wherein the ribbed surface includes at least two spaced apart ribs protruding from the exterior surface of the sleeve.

9. The apparatus of claim 1 wherein the central bore includes two portions, one portion having a diameter that is larger than the diameter of the other portion.

10. A collet stop apparatus comprising:
    a body having a central bore and a flanged first end and a second end, the body including an externally threaded portion near the second end;
    a flexible tubular sleeve member substantially surrounding the body between the first and second ends of the body, the sleeve member including a ribbed exterior surface, one end of the ribbed exterior surface having a flanged end extending radially outwardly from the remaining portion of the exterior surface; and
    a nut sized to be threaded to the externally threaded portion of the body, the nut and flanged first end of the body each having inclined surface portions arranged for urging the sleeve away from the body as the nut is threaded in a direction toward the first end of the body.

11. The apparatus of claim 10 wherein the ribbed surface includes at least two spaced apart ribs protruding from the exterior surface of the sleeve.

12. The apparatus of claim 10 further including knurled portions formed on the nut and on the body of the apparatus.

* * * * *